Dec. 26, 1961  H. R. BRUET  3,014,378
FLUID CONTROLLED VARIABLE SPEED BELT TRANSMISSION
Filed Feb. 25, 1958  2 Sheets-Sheet 1

FIG.I

Inventor
HENRI RENÉ BRUET
By Toulmin & Toulmin
Attorneys

United States Patent Office

3,014,378
FLUID CONTROLLED VARIABLE SPEED BELT TRANSMISSION
Henri René Bruet, Paris, France, assignor of one-half to Etablissements A. Cazeneuve, La Plaine-Saint-Denis, France, a French company
Filed Feb. 25, 1958, Ser. No. 717,507
Claims priority, application France Mar. 6, 1957
14 Claims. (Cl. 74—230.17)

The present invention relates to improvements in speed varying arrangements and more particularly in those used in the control of machines, especially of machine tools.

It is particularly concerned with the control of continuous speed variations in a speed varying arrangement of the belt type and which generally comprises a V-belt which is passed round two pulleys whose cheeks have corresponding inclinations and are capable of being moved toward or away from one another under the effect of a suitable control.

The object of the invention is to provide, for the purpose of avoiding the disadvantages of known controls, a flexible, rapid, precise servo control which requires only a small actuating force, has no reactions on the actuating devices, and is capable of prolonged operation without notable wear.

According to the invention, in a speed varying arrangement for progressively varying speeds by means of a belt passing around pulleys and comprising a mechanism causing the diameters of contact of the belt with the pulleys to vary, this mechanism is actuated by a preferably incompressible fluid under pressure which acts in a variable-volume closed chamber forming a unit with the pulley, said mechanism being responsive to variations in the volume of said chamber, the quantity of fluid in said chamber being regulated by a control valve which also preferably forms a unit with the pulley, this valve being of the follow-up type the following member of which is connected to the controlled mechanism, that is whose position depends on that of the members of the mechanism upon which position depends the diameter of contact of the belt with the pulley.

In particular when the pulleys are of the type adapted for V-shaped belts in which the variation in the diameter of contact of the belt with the pulleys is produced by a relative axial displacement of the cheeks of the pulley, one of said cheeks is connected to said follow-up member of the control valve so that it receives an axial thrust and its position depends on that of said follow-up member, and the other is associated with means whereby it receives an axial thrust which is substantially equal and in opposite direction to that to which the other cheek is subjected, so that said two axial thrusts tend to urge the two cheeks toward one another.

In a preferred embodiment of this latter type of speed varying arrangement only one of the pulleys is provided with a control valve and the two cheeks of the other pulley are permanently urged to move toward one another under the effect of a force less than that the fluid under pressure can exert on the other pulley owing to the action of said control valve for urging the two cheeks toward one another, so that the relative axial displacement of the cheeks is transmitted through the medium of the belt under the effect of a difference in the lateral gripping force on the inclined sides of the belt by the cheeks of one and the other pulley.

The invention extends also to any machine and particularly to any machine tool provided with a speed varying arrangement according to the invention.

Further features and advantages of the invention will be apparent from the ensuing description, with reference to the accompanying drawings to which the invention is in no way restricted.

This description will give a clear understanding of the device embodying the invention in an application to the drive of a machine spindle.

Figure 1:
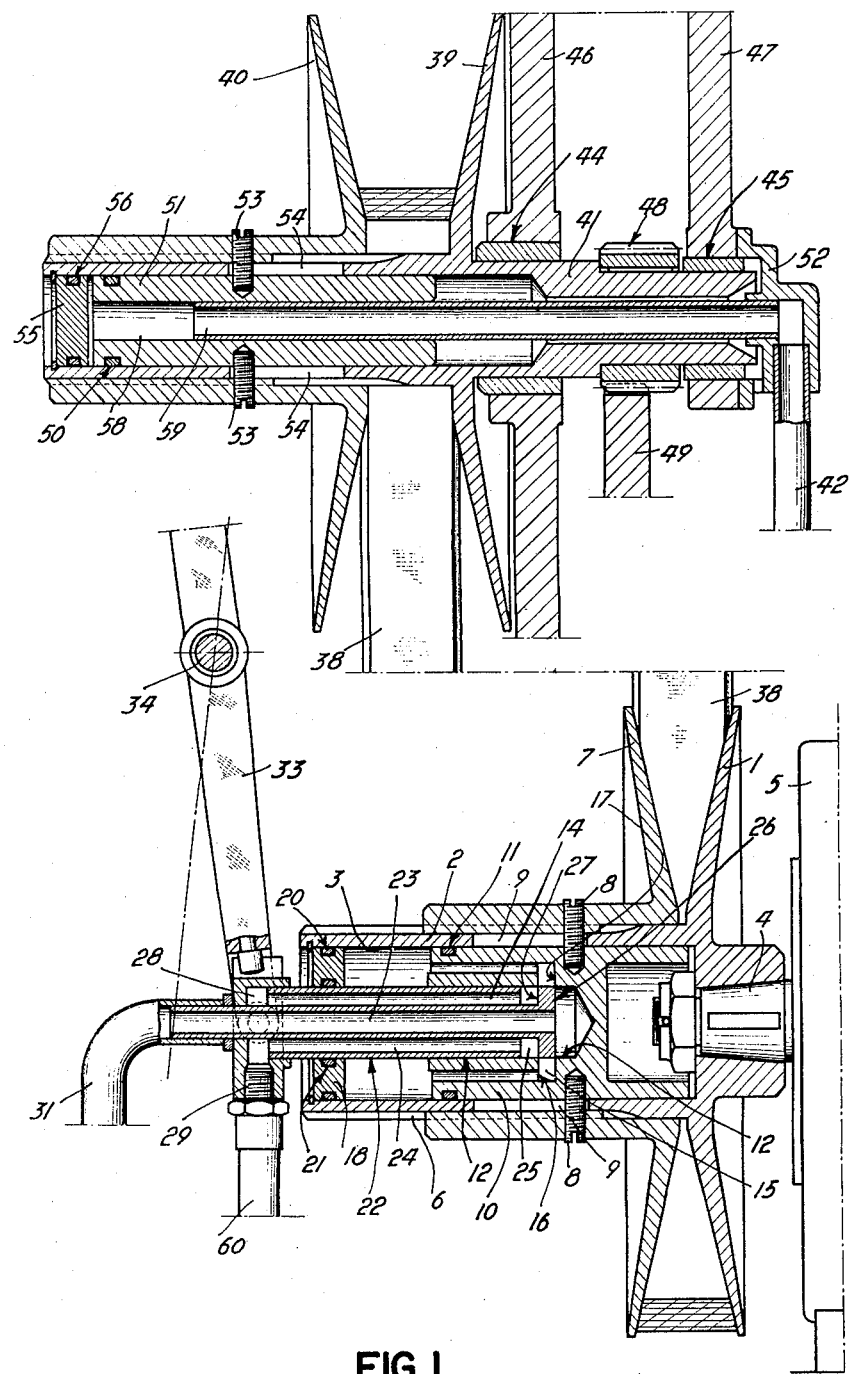
FIG. 1 is a longitudinal sectional view of a speed variator embodying the invention, used in the drive of a machine spindle.
Figure 2:
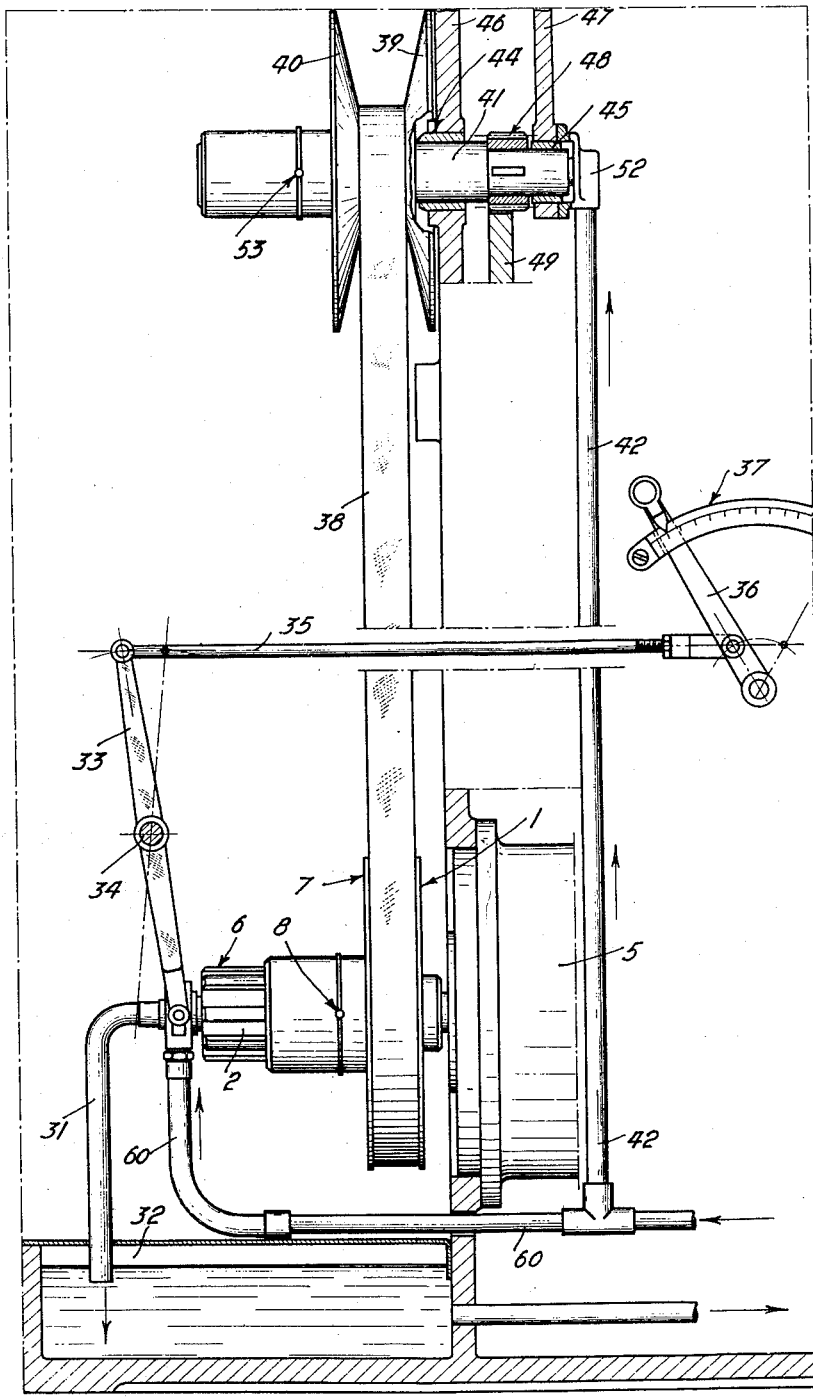
FIG. 2 is a diagrammatic view of the assembly of the variator with its actuating device.

In the embodiment shown in FIGS. 1 and 2, the device comprises a pulley cheek 1 provided with a tubular extension 2 having a bore 3 which is keyed and held fast on the tapered end of a shaft 4 of an electric motor 5. Splines 6 are formed on the extension 2 and mounted on the extension coaxially with the cheek 1 is a cheek 7 having corresponding splines engaging with the splines 6. The cheek 7 carries two fingers or studs 8 which extend through slots 9 of suitable length and engage in apertures formed in a piston 10 which has an easy slide fit in the bore 3. The piston 10 carries a sealing ring 11 and has a central bore 12 closed at one end and longitudinally extending apertures 14 of suitable number which communicate with an inner recess 15 defined by faces 16 and 17. The piston 10 is capable of abutting a ring 18 which has a bore of the same diameter as the bore 12 and has a tight fit in and is coaxial with the bore 3. This ring 18 is held in position longitudinally by a keeper ring, circlip or any other means and is provided with two sealing rings 20 and 21.

A valve member 22 is in an easy slide fluid-tight fit in the bore of the ring 18 and in the bore 12 of the piston 10. The valve-member 22 is provided with a central aperture or bore 23 and apertures 24 which communicate with an outer recess 25 and with an inner recess 28 with which latter communicates a tapped hole 29 in which is mounted a partially flexible tube 60 which supplies the liquid under pressure. The recess or groove 25 is provided at a distance from the end face 26 of the valve member 22 at least equal to, and preferably greater than, the width or axial extent of the recess 15. Mounted at the end of the valve member 22 is a tube 31 which is partially flexible and is provided for returning the liquid to the sump or reservoir 32 whence it is drawn for the purpose of again sending it through the pressure circuit after filtering.

The sliding movements of the valve member 22 are controlled by the lever 33 which is pivotable about a pin 34 and connected by a connecting rod 35 to a control lever 36 which moves, for example, along a graduated sector member 37. The valve member 22 is prevented from rotating by the lever 33 or by any other means, so that the piston 10, the ring 18 and the rest of the device rotate relative thereto without exerting force and with an abundant supply of lubrication, the liquid under pressure being preferably oil.

The cheeks 1 and 6 constitute a driving pulley round which is passed the V-belt 38 which is also passed round a driven pulley formed by a cheek 39 rigid with a shaft 41 which drives in rotation, through the medium of splines, a cheek 40 slidable thereon. The shaft 41 can be moved axially such distance as to permit the pulley formed by the cheeks 39 and 40 to follow the lateral displacements of the belt 38 when varying its pulley engaging diameters. The shaft 41 is provided with a bore of sufficient length and is journalled in bearings 44 and 45 carried by side members 46 and 47 of the stand of the machine. A gear 48 keyed on the shaft 41 meshes with a gear 49 which is, for example, mounted on the machine spindle (not shown in the drawings).

A piston 51, provided with a sealing ring 50, is in an easy slide fit in the bore of the shaft 41 and is connected to the cheek 40 by pins or studs 53, which extend through slots 54 provided for this purpose, so that any longitudinal movement of the piston 51 results in similar movement of the cheek 40. The shaft 41 is closed at its end by a plug 55 which carries a sealing ring 56 and is held in axial position by a keeper ring, circlip or any other device.

The piston 51 is provided with a central bore 58 through which extends a tube 59 communicating with a connection 52. This tube 59 is preferably freely mounted in the bore 58 but with sufficient fluid-tightness. The connection 52 communicates by way of a tube 42 with the source of liquid under pressure (not shown in the drawing).

The effective area of the piston 51 is smaller than the effective area of the piston 10.

The variator of the invention operates in the following manner:

The electric motor 5 drives by way of the shaft 4 the driving pulley consisting of cheeks 1 and 7. This rotation is transmitted by the V-belt 38 to the driven pulley having cheeks 39 and 40, the liquid under pressure flows through the tubes 42 and 60 and fills the passageways and spaces between the piston 10 and the end formed by the ring 18, and between the piston 51 and the plug 55.

The control lever 36, the connecting rod 35 and the lever 33 control the position of the valve member 22 whose sliding movement determines or permits the displacement or stoppage of the piston 10 in the following manner.

In the position shown in FIG. 1, the cylindrical part of the valve member 22, defined by the lateral faces 26 and 27, closes the recess 15 defined by the faces 16 and 17. If, starting from this position, the pilot valve member 22 moves toward the right as seen in FIG. 1, the edge of the face 27 uncovers the edge of the face 16 and thus establishes a communication between the source of liquid under pressure and the face of the piston 10 by way of the apertures and passageways 14, 24 and 60. The piston 10 is thus urged toward the right and this movement is transmitted to the cheek of the pulley 7 by the studs 8. This thrust is balanced by the equal and opposite thrust acting on the disc 18 which reacts on the cheek 1, so that the belt 38 is held between equal and opposed forces. The pilot valve member 22 being held in position, the pressure exerted on the piston 10 shifts the latter until the edge of the face 16 of the recess 15 becomes flush with the edge of the face 27 of the valve member 22; the piston 10 stops and the incompressible liquid prevents its movement toward the left. The piston 10 thus constitutes the follow-up member of a follow-up valve the pilot member of which is the valve member 22.

If the pilot valve member 22 moves toward the left, the edge of the face 26 uncovers the edge of the face 17 of the recess 15 and this puts the space between the piston 10 and the ring 18 and the apertures 14 in communication with the central bore 23 and the tube 31 and permits, under the effect of the thrust of the piston 10, discharging without appreciable pressure the liquid into the reservoir 32. When the valve member 22 stops its movement toward the left, the piston 10 can continue its movement in the same direction until the edge of the face 16 of the recess 15 comes into alignment with the edge of the face 26 of the valve member and thus closes the recess 15 and stops the piston 10 from moving. It will be observed that for any movement to the right or left of the valve member, there corresponds a precise position of the piston 10 which is thus slaved to the movement of the pilot valve member.

The belt 38, which passes between the cheeks 1 and 7 of the driving pulley, has a constant length and passes round the driven pulley having the cheeks 39 and 40. The liquid under pressure supplied by the tube 42 is fed, by the tube 59 and the bore 58, between the piston 51 and the end plug 55 against which it exerts substantially equal and opposing pressures. The force exerted by this pressure on the piston 51 shifts the latter and its movement is transmitted by the studs 53 to the cheek 40; the force acting on the end 55 is transmitted to the cheek 39 so that the belt 38 is gripped by the cheeks 39 and 40 exerting opposed forces.

The intensity of the forces gripping the belt 38 depends, for a given pressure, on the effective surface of the pistons 10 and 51. As the piston 10 has been constructed to have an effective surface greater than the effective surface of the piston 51, the gripping effect it exerts on the belt 38 is greater than that exerted by the piston 51.

Further, owing to the effect of the valve member 22, the force exerted on the piston 10 could correspond to the effective surface of the piston 10 and the pressure it receives, or could be eliminated when the valve member 22 closes off the supply of liquid under pressure and thus blocks the piston 10 in position, or could be cancelled out when the member 22 permits discharge of the liquid to the reservoir 32.

When the pilot valve member 22 allows discharge of the liquid to the reservoir 32, the pressure exerted by the cheeks 1 and 7 on the belt 38 ceases, whereas the gripping of the belt by the cheeks 39 and 40 on the inclined sides of the belt is maintained and this causes the belt to move away from the centre of rotation and thus increases its diameter of contact with the pulley. Now, as its length is constant, this causes its diameter of contact with the driving pulley to decrease, the cheek 7 of the driving pulley moving away from the cheek 1 and shifting the piston 10 which urges the liquid through the apertures 14, the bore 23 and the tube 31 toward the reservoir 32.

The belt 38 thus caused to be driven at maximum diameter of contact on the driven pulley having the cheeks 39 and 40, and at minimum diameter of contact on the driving pulley having cheeks 1 and 7, having passed through all the intermediate diameters of contacts with the pulleys, provides the lowest speed ratio between the shafts 2 and 41. If in this position the pilot valve member 22 is urged toward the right as seen in FIG. 1, the liquid under pressure, as already explained arrives between the piston 10 and the ring 18 and creates the gripping forces whose reactions on the sides of the belt 38 are greater, as mentioned hereinbefore, than those created on the belt 38 by the effect of the pressure between the piston 51 and the end 55. Owing to this difference of action the cheeks 1 and 7 move toward one another and a traction is exerted on the belt of constant length which progressively separates the cheeks 39 and 40 of the driven pulley in opposition to the force exerted by the piston 51, so that the belt passes through all the intermediate diameters of contact until it reaches the minimum diameter of contact shown in FIGS. 1 and 2.

As explained hereinbefore, each position of the pilot valve member 22 determines a corresponding position of the piston 10 and places the belt 38 on diameters of contact with the pulleys which provide a definite rotational speed ratio between the shafts 2 and 41. This position of the pilot valve member is advantageously indicated on a sector member such as the member 37 or the like, which has a single or multiple graduated scale so as to provide a convenient indication of the speed of the driven shaft or the machine shaft.

Advantageously, the thrust exerted on the piston 51 by the liquid under pressure could be combined with an elastically yieldable thrust which increases in intensity with separation of the cheeks 39 and 40. For this purpose, it is sufficient to dispose a spring (not shown in the drawings) between the piston 51 and the end 55, this spring being coaxial with the piston.

The device of the invention could be combined advantageously with a pump having a pressure relief or pressure reducing valve so as to maintain the liquid at substantially constant pressure in the hydraulic circuit notwithstanding possible leakages which would have a tendency to increase with wear, so that the correct operation and the efficiency of the control would remain substantially constant during a long period of use.

The foregoing description shows that the forces created by the liquid under pressure in the device are suitably balanced and exert no disadvantageous reaction outside the system. Lubrication oil for the machine incorporating the device of the invention is preferably used as the motive liquid under pressure as this advantageously ensures an effective lubrication and avoids any substantial wear.

The force required for controlling the speed ratio variations is restricted to the force necessary to shift the pilot valve member 22 which offers a merely very small resistance to its displacement, the latter being slow or rapid toward the right or toward the left, as seen in FIG. 1, so as to obtain a speed ratio change which is progressive, slow or accelerated, as desired.

What I claim is:

1. A pulley for belt transmission with variable transmission ratio, comprising means for varying the diameters of contact of the belt with the pulley, said pulley having a hollow boss providing a cylinder closed at an end, and said means including a piston like valve member slidably and fluidtightly fitted in said cylinder and having a central bore and a pilot valve member fluidtightly and slidably projecting into said hollow boss axially thereof through said cylinder end and being fluidtightly engaged in said bore, said pilot valve member being provided with at least two longitudinal passageways, one of which for the supply of a fluid under pressure and the other for the escape of the latter, said piston valve member being further provided with a passageway from the piston end facing the cylinder end to the lateral wall of said central bore, said pilot valve member being arranged to selectively cause said passageway of the piston-valve member to communicate with that longitudinal passageway of the pilot valve member for the fluid supply or that for the fluid escape, and a member externally carried by said boss and movable relatively thereto, the diameter of contact of the pulley with the belt depending on the position of said member relatively to said boss, said member being operatively connected to said piston valve member through said hollow boss wall, to have a position relatively to the boss depending upon the varying longitudinal position of said piston valve member in said boss.

2. A pulley as in claim 1, shaped for use with a V-belt having two coaxially disposed and relatively movable belt engaging cheeks, wherein said member operatively connected to the piston valve member is one of said pulley cheeks which is slidably keyed onto said boss and tied to said piston member through a slot in said boss wall.

3. A pulley as in claim 1, further having one of said passageways in the pilot valve member constituted by an axial bore of said member, a fluid escape duct connected to said pilot valve member outside said hollow boss and in communication with said central bore, and a fluid under pressure supply pipe also connected to said pilot valve member outside said boss and in communication with said other longitudinal passageway in said pilot valve member.

4. In a pulley as in claim 1, said central bore in the piston valve member having a fluidtight bottom and either the passageway means through said pilot valve member for the fluid supply or that for the fluid escape opening in the pilot member end facing said bottom so that communication between said passageway means and the passageway through said piston valve member will be afforded through the part of said central bore in the piston valve between said bore bottom and pilot member end.

5. A pulley for belt transmission with variable transmission ratio having a hollow boss and carrying means actuatable by fluid under pressure for varying the diameters of contact of the belt with it, said means including a control valve arranged inside said boss for the fluid supply and release and comprising a pilot member projecting axially outside said boss with which it is in fluidtight and both slidable and rotational engagement, and a pilot follower the position of which depends on that of the actual diameter of contact of the pulley with the belt.

6. A V-belt transmission with variable transmission ratio, including driving and driven pulleys and means actuatable by fluid under pressure for varying the diameter of contact of the pulleys with the belt and including a control valve for the supply and escape of said fluid, wherein said means are arranged for applying to one of said pulleys a permanent fluid thrust tending to increase the diameter of contact of the belt with said one pulley, whereas said control valve provides for selectively applying to the other pulley a fluid thrust greater than said permanent fluid thrust and tending to increase the diameter of contact of said other pulley with the belt, so that said first mentioned diameter is actually decreased by the belt reacting to said permanent thrust or increased according to whether said control valve is set for the escape or the supply of said fluid under pressure.

7. A self-contained transmission pulley for V-belt transmissions with variable transmission ratio, comprising an axially movable pulley cheek, and means carried by the pulley and actuable by liquid under pressure to move said cheek axially, wherein said means comprise a control pilot valve for controlling the supply and escape of a liquid under pressure, which valve includes a control pilot member and a pilot following member so connected to one of said cheeks that the position of the latter and thereby the transmission ratio are determined by the position of said following member.

8. In a V-belt transmission with variable transmission ratio, a pulley as in claim 7, and a stationary supported control member connected to the pilot member of the pulley to move the latter and determine its position.

9. In a V-belt transmission as in claim 8, indicating means of the position of said control member and including a scale graduated in dependence on the transmission ratio.

10. A V-belt transmission with variable transmission ratio, including driving and driven pulleys each of which comprises an axially movable pulley cheek, means actuatable by liquid under pressure for varying the diameter of contact of the pulleys with the belt, and a control valve for the supply and escape of said liquid, wherein said means actuatable by liquid under pressure includes two pressure responsive movable members one of which is connected to the movable cheek of one pulley and the other with the movable cheek of the other pulley, so that the position of each cheek is determined by the position of its associated movable member, duct means arranged permanently to supply liquid under pressure to and cause it to exert a permanent thrust on one of said movable members, said control valve having an inlet and an outlet, pipe means connected to said valve inlet for feeding liquid under pressure to said valve arranged to control the supply of this liquid onto the other of said movable members to exert a thrust thereon, the arrangement being such that said latter thrust will be greater than said permanent thrust.

11. A V-belt transmission as in claim 10, wherein the liquid pressed operative surface of the movable member subjected to permanent thrust is smaller than that of the other movable member.

12. A V-belt transmission as in claim 10, wherein the liquid pressure in said duct means is in constant relation with the pressure of the liquid in said pipe means.

13. A V-belt transmission as in claim 12, wherein the liquid pressure is the same in both said duct means and pipe means.

14. A V-belt transmission as in claim 13 wherein said duct means are branched off said pipe means.

References Cited in the file of this patent

UNITED STATES PATENTS

| | | |
|---|---|---|
| 2,198,940 | Heyer et al. | Apr. 30, 1940 |
| 2,295,161 | Clay | Sept. 8, 1942 |
| 2,308,868 | Durdin | Jan. 19, 1943 |
| 2,779,203 | Eubanks | Jan. 29, 1957 |

FOREIGN PATENTS

| | | |
|---|---|---|
| 8,451 | Great Britain | of 1907 |
| 464,891 | Great Britain | Apr. 27, 1937 |